(12) United States Patent
Taskar

(10) Patent No.: US 7,784,496 B2
(45) Date of Patent: *Aug. 31, 2010

(54) TRIPLE VALVE INLET ASSEMBLY

(75) Inventor: Mark Taskar, San Mateo, CA (US)

(73) Assignee: Lam Research Corporation, Fremont, CA (US)

( * ) Notice: Subject to any disclaimer, the term of this patent is extended or adjusted under 35 U.S.C. 154(b) by 643 days.

This patent is subject to a terminal disclaimer.

(21) Appl. No.: 11/761,244

(22) Filed: Jun. 11, 2007

(65) Prior Publication Data

US 2008/0302433 A1 Dec. 11, 2008

(51) Int. Cl.
*F16K 11/10* (2006.01)

(52) U.S. Cl. .................................. 137/884; 251/114

(58) Field of Classification Search ............. 137/269, 137/270, 271, 597, 884; 251/32, 114
See application file for complete search history.

(56) References Cited

U.S. PATENT DOCUMENTS

| | | | |
|---|---|---|---|
| 5,992,463 A | 11/1999 | Redemann et al. | |
| 6,035,893 A * | 3/2000 | Ohmi et al. | 137/884 |
| 6,189,570 B1 | 2/2001 | Redemann et al. | |
| 6,192,938 B1 | 2/2001 | Redemann et al. | |
| 6,293,310 B1 * | 9/2001 | Redemann et al. | 137/884 |
| 6,298,881 B1 * | 10/2001 | Curran et al. | 137/884 |
| 6,408,879 B1 * | 6/2002 | Ohmi et al. | 137/606 |
| 6,450,200 B1 * | 9/2002 | Ollivier | 137/624.12 |
| 6,634,385 B2 * | 10/2003 | Symington | 137/884 |
| 2006/0278835 A1 | 12/2006 | Taskar | |

* cited by examiner

*Primary Examiner*—John Fox
(74) *Attorney, Agent, or Firm*—Beyer Law Group LLP

(57) ABSTRACT

A gas delivery apparatus having a manifold block configured to create a fluid flow path, a horizontal inlet port coupled to the manifold block at a first side in fluid communication with the fluid flow path and configured to receive a supply gas, a pneumatic valve coupled to the manifold block at a first end configured to prevent unauthorized activation of fluid flow, the pneumatic valve in fluid communication with the fluid flow path and horizontal inlet port, a purge valve coupled to the manifold block in fluid communication with the fluid flow path positioned adjacent the pneumatic valve, and a vertical purge port coupled to the manifold block at a first end, the vertical purge port positioned between the purge valve and the pneumatic valve and having a purge gas input/output connection at a second end, wherein the horizontal inlet port is positioned perpendicular to the vertical purge port.

16 Claims, 6 Drawing Sheets

TRIPLE VALVE INLET ASSEMBLY

FIELD OF THE INVENTION

The present invention relates to gas delivery systems. More particularly, the present invention relates to a triple valve inlet assembly for gas delivery systems.

BACKGROUND OF THE INVENTION

A conventional semiconductor etch processing system may have a gas source, a gas delivery system connected to the gas source via supply gas lines, and a processing plasma chamber connected to the gas delivery system. The gas delivery system further includes gas sticks coupled to the gas supply lines. The gas sticks are a series of gas distribution and control components such as a mass flow controller, one or more pressure transducers and/or regulators, a heater, one or more filters or purifiers, and shutoff valves. The components used and their particular arrangement in a gas stick can vary depending upon their design and application. In a typical semiconductor processing arrangement, over seventeen gas sources are connected to the chamber via the gas supply lines, gas distribution components on a manifold, a mixing manifold, which are all typically mounted to a frame or base plate, forming a complete system known as "gas panel" or "gas box".

The conventional semiconductor etch processing system depends on the use of several hazardous and non-hazardous processing gases and carefully measured delivery of over seventeen gases from the gas source to the processing plasma chamber via the gas supply lines in a synchronized mode. Such systems usually require gas delivery systems for coupling high purity gases for semiconductor processing systems or other thin film coating processes. However, in semiconductor manufacturing, the dimensions of semiconductor devices are decreasing and there is less room to accommodate more components. Current gas panels do not provide for the flexibility to add additional components and/or add or remove individual gas sticks to the gas panel.

BRIEF DESCRIPTION OF THE INVENTION

A gas delivery apparatus provides for a gas delivery system having a triple valve inlet assembly (TVIA). The TVIA provides for a gas delivery assembly that incorporates three functional components into a single unit. In one embodiment, a gas delivery apparatus may have a manifold block configured to create a fluid flow path, a horizontal inlet port coupled to the manifold block at a first side in fluid communication with the fluid flow path and configured to receive a supply gas, a pneumatic valve coupled to the manifold block at a first end configured to prevent unauthorized activation of fluid flow, the pneumatic valve in fluid communication with the fluid flow path and horizontal inlet port, a purge valve coupled to the manifold block in fluid communication with the fluid flow path positioned adjacent the pneumatic valve, and a vertical purge port coupled to the manifold block at a first end, the vertical purge port positioned between the purge valve and the pneumatic valve and having a purge gas input/output port at a second end, wherein the horizontal inlet port is positioned perpendicular to the vertical purge port.

In another embodiment, the gas delivery apparatus may have a manifold block configured to create a fluid flow path, a pneumatic valve coupled to the manifold block at a first end configured to prevent unauthorized activation of fluid flow, the pneumatic valve in fluid communication with the fluid flow path, a horizontal inlet port coupled to the pneumatic valve near the first end configured to receive a supply gas, a purge valve coupled to the manifold block in fluid communication with the fluid flow path positioned adjacent the pneumatic valve, and a vertical purge port coupled to the manifold block at a first end, the vertical purge port positioned between the purge valve and the pneumatic valve and having a purge gas input/output port at a second end, wherein the horizontal inlet port is positioned perpendicular to the vertical purge port.

These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention.

In the drawings.

DETAILED DESCRIPTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The present invention provides for a gas delivery system having a triple valve inlet assembly (TVIA) that may be applied to vacuum coupled ring (VCR) and integrated gas system (IGS) gas delivery systems. The TVIA provides for a gas delivery assembly that incorporates three functional components into a single unit. This provides for a smaller sized gas panel that costs less to manufacture than current gas panels. The TVIA may also allow for greater flexibility by allowing a user to add and/or remove gas sticks with minimal dead legs in the mixing and pump/purge manifold assemblies and the use of little to no real estate on the gas stick.

Figure 1A:
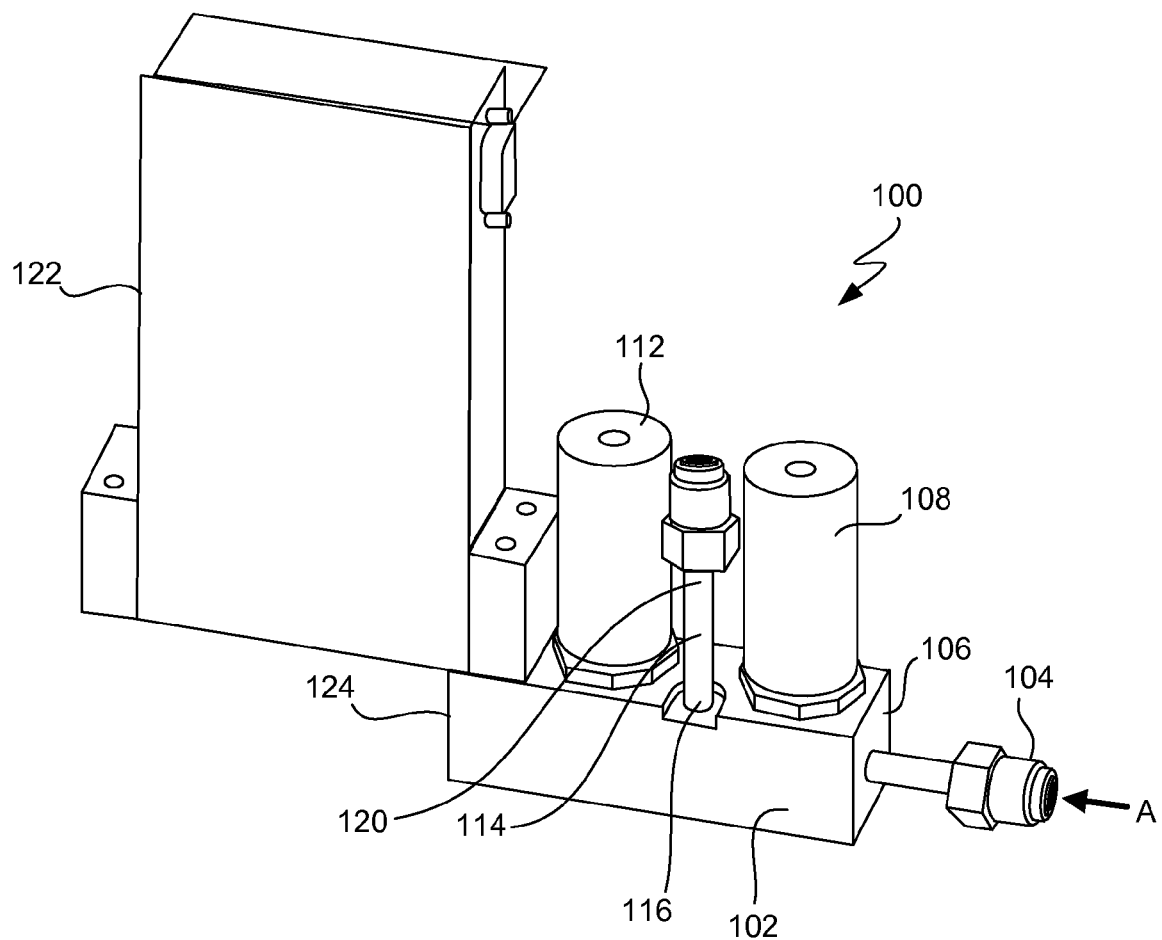
FIGS. 1A and 1B illustrate example embodiments of the triple valve inlet assembly.
Figure 1B:
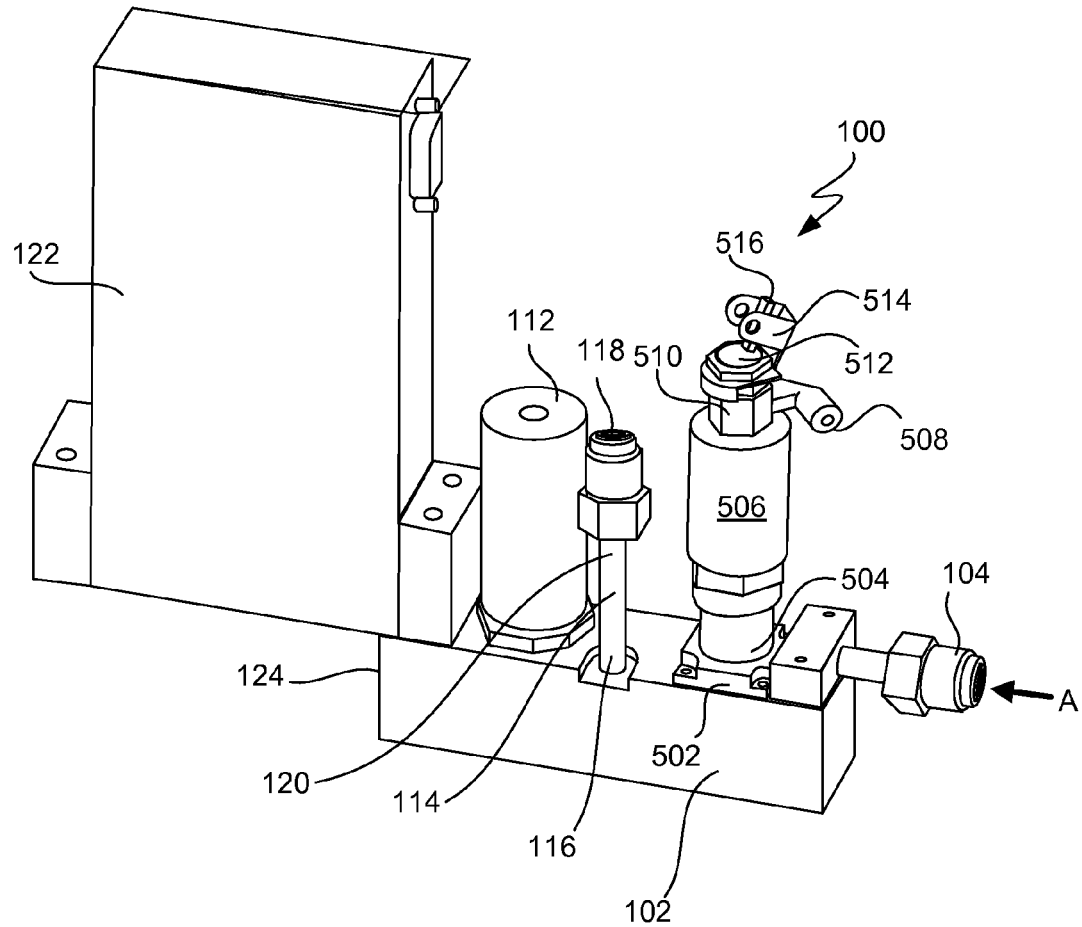

FIGS. 1A and 1B illustrate example embodiments of the triple valve inlet assembly. The TVIA 100 may have a manifold block 102 configured to create a fluid flow path whereby various gas delivery components may be removably coupled thereto. The various components may be removably coupled to the manifold block 102 via any known means such as with a fastening means, such as a screw, or a pressure seal, and the like. A horizontal inlet port 104 may be coupled to the manifold block 102 at a first side 106. The horizontal inlet port 104 may be in fluid communication with the fluid flow path and configured to receive a supply gas as illustrated by arrow A. As illustrated in FIG. 1A, the horizontal inlet port 104 may be manufactured as part of the manifold block 102. Alternatively, as illustrated in FIG. 1B, the horizontal inlet port 104 may be a separate component and attached to the manifold block 102. The inlet port 104 may be any type of connection known in the art, such as a VCR connection.

A pneumatic valve 108 may be coupled to the manifold block 102 at the first end 106. The pneumatic valve 108 may be in fluid communication with the fluid flow path and horizontal inlet port 104. The pneumatic valve 108 may be used to prevent unauthorized activation of fluid flow. FIG. 1B illustrates an example embodiment of a pneumatic valve 110 having a safety mechanism. In an embodiment, the valve is an integrated surface mount valve. In general, an integrated surface mount component is a gas control component (e.g., valve, filter, etc.) that is connected to other gas control components through channels on a manifold assembly, upon which the gas control components are mounted. This is in contrast to gas control components that are generally attached through bulky conduits with VCR attachments.

In an embodiment, the valve may be a gas stick inlet valve. In another embodiment, the valve may be an IGS valve. The pneumatic valve 506 may have a manifold assembly 502 to which the pneumatic valve 506 may be attached through an adapter 504. In an embodiment, adapter 504 may be threaded. A pressure coupling 508 may allow a compressed gas line (not shown) to be attached to the pneumatic valve 506 through adapter-fitting 510. That is, as compressed air enters the pneumatic valve 506 through adapter-fitting 510, a valve mechanism may be engaged and gas may be allowed to flow in the gas stick.

In one embodiment, the adapter 510 may be threaded. A manual shutoff switch 512 and lockout/tagout mechanism 514 may be removably coupled to the adapter 510. When manual shutoff switch 512 is engaged by toggle arm 516, compressed gas may be blocked causing the pneumatic valve 506 to be deactivated, and stopping plasma gas flow within the gas stick. In addition, the manual shutoff switch 512 may also contain an exhaust port allowing any compressed air that was in pneumatic valve 506, prior to the engagement of manual shutoff switch 512, to be vented. That is, the pressure within pneumatic valve 506 may be made substantially the same as the pressure outside pneumatic valve 506. In addition, a lock and/or tag may thus be added to lockout/tagout mechanism 514, in order to substantially ensure the safe maintenance of the plasma processing system. In one embodiment, the optimized activation prevention assembly may be configured to minimize early or accidental removal. That is, pneumatic valve 506 may not be activated without first removing the lock and/or tag, or substantial damage may occur in the gas delivery system. In another embodiment, the lock is non-reusable. In yet another embodiment, the lock may be manually attached. In still another embodiment, the lock may be self-locking or non-releasable. The tag may be a one-piece nylon cable tie and may state one of the following: "DO NOT START," "DO NOT OPEN," "DO NOT CLOSE," "DO NOT ENERGIZE," and "DO NOT OPERATE."

A 3-port air-operated purge valve 112 may be coupled to the manifold block 102 positioned adjacent the pneumatic valve 108, 110. The purge valve 112 may be in fluid communication with the fluid flow path to allow for the removal of any corrosive supply gasses remaining in the gas stick.

A vertical purge port 114 may be coupled to the manifold block 102 at a first end 116. The vertical purge port 114 may be positioned between the purge valve 112 and the pneumatic valve 110 and may be perpendicular to the horizontal inlet port 104. For example, the vertical purge port 114 and horizontal inlet port 104 may be at about a 90° angle. The vertical purge port 114 may have a purge gas input/output connection 118 at a second end 120 to allow for the input and/or discharge of purge gasses. The vertical purge port 114 may also be used to replace the purge manifold on current gas boxes. Alternatively, the vertical purge port 114 may be used as an additional test or pressurization port, such as to test the moisture or particle level in the gas delivery system. The vertical purge port 114 may also allow the TVIA to be used in any gas delivery system where space is limited and/or space for separate and additional valves is limited. Moreover, multiple gas sticks may be individually connected or disconnected to the TVIA with minimal dead legs.

A mass flow controller (MFC) 122 may be coupled to the manifold block 102 at second side 124. The MFC 122 accurately measures the flow rate of the supply gas. Positioning the purge valve 112 next to the MFC 122 allows a user to purge any corrosive supply gasses in the MFC 122.

Figure 2A:
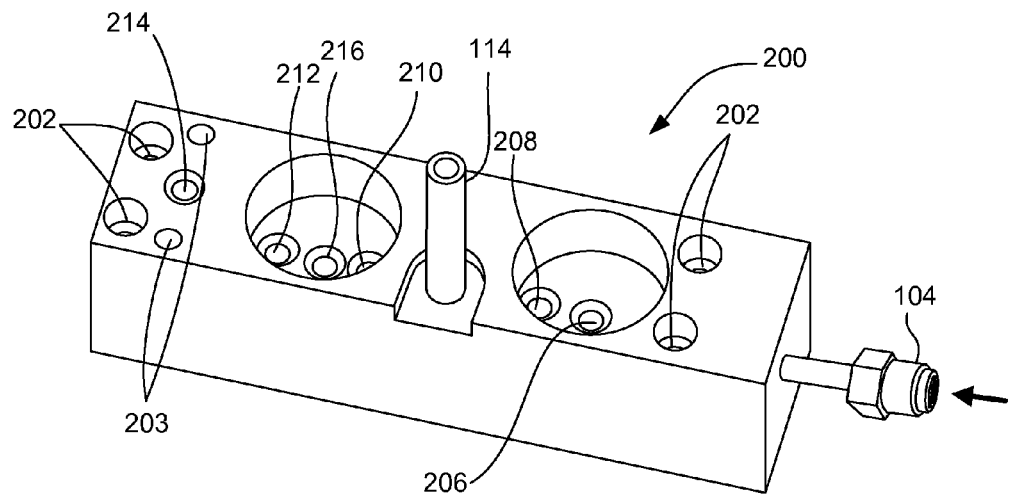
FIGS. 2A and 2B illustrate an exemplary manifold block.
Figure 2B:
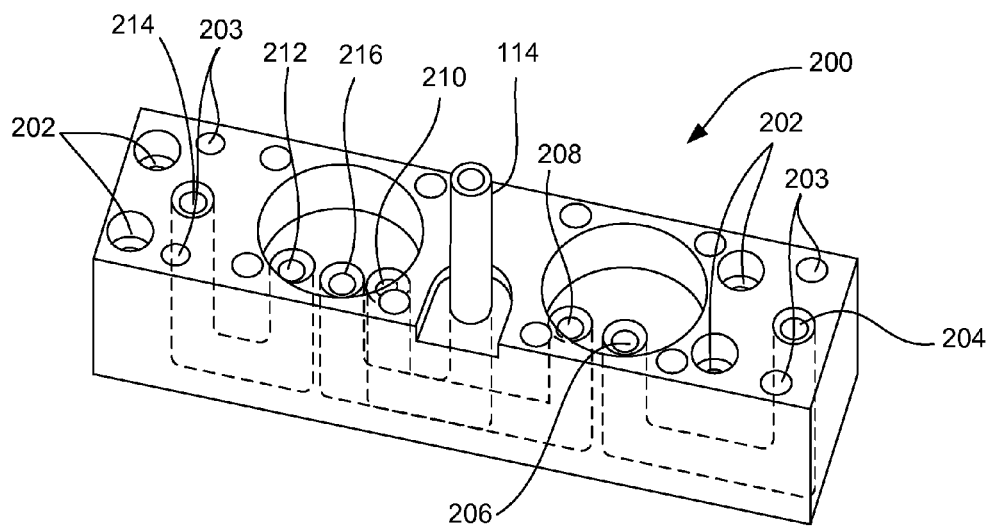

FIGS. 2A and 2B illustrate an exemplary manifold. FIG. 2A illustrates the exemplary manifold of FIG. 1A and FIG. 2B illustrates the exemplary manifold of FIG. 1B. As stated above, the manifold 200 is configured to create a fluid flow path for the gas delivery system. The manifold may have a plurality of apertures 202 to receive a connecting means, such as a screw, to removably connect the manifold to the base plate (not shown). Additional apertures 203 may receive connecting means to connect the gas delivery components to the gas block, such as the horizontal inlet port 104 and the MFC 122. There may be an inlet port 204, such as a VCR port, to receive a supply gas from the horizontal inlet connection 104, which may be in fluid communication with an inlet port 206 for the pneumatic valve 108. An outlet port 208 may be in fluid communication with an inlet port 210 for the purge valve 112. The purge valve 112 may be a three port manifold having an inlet port 210, an outlet port 212, and a discharge port 216. The outlet port may be in fluid communication with an inlet port 214 to the MFC 122. In one embodiment, the inlet port 214 may be a VCR port. The discharge port 216 may be in fluid communication with the vertical purge port 114.

Figure 3A:
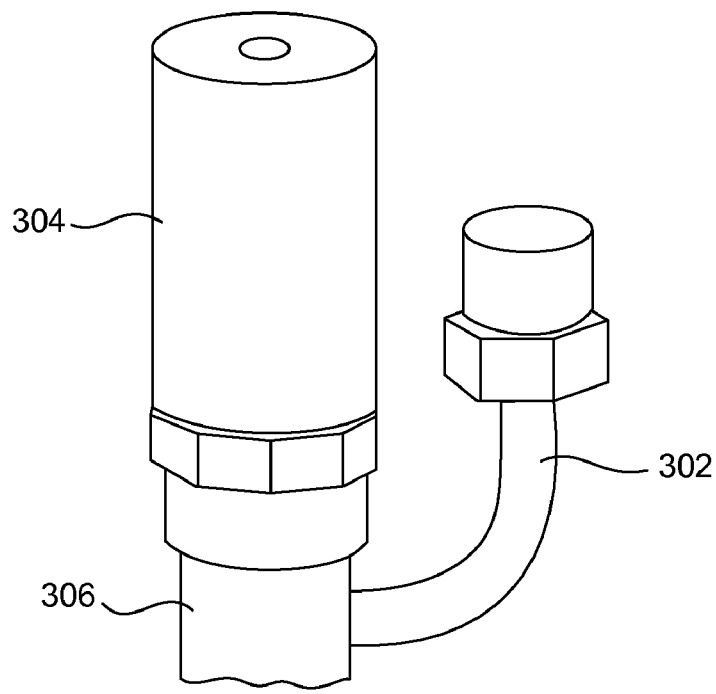
FIGS. 3A-3C illustrate example embodiments of a supplementary test port.
Figure 3B:
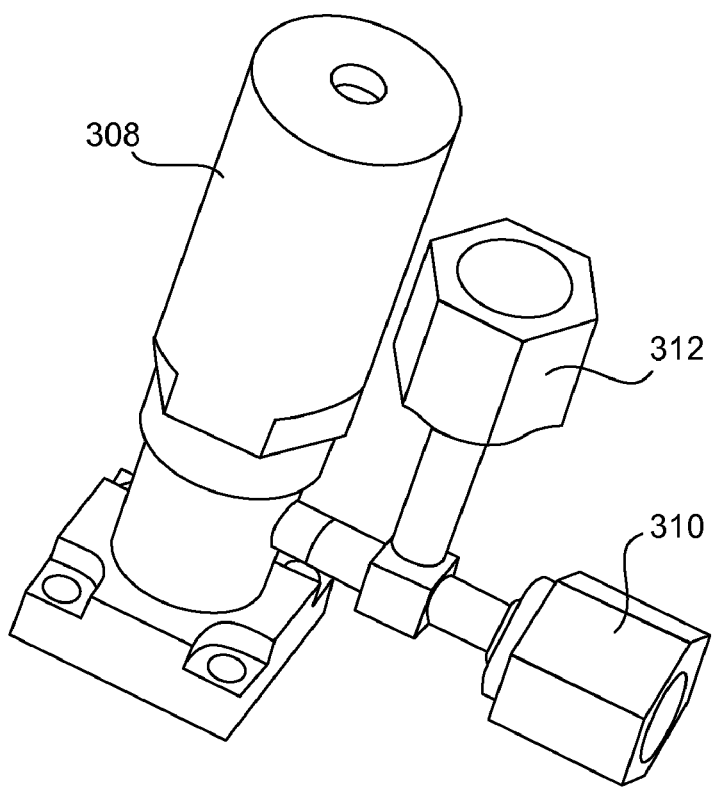
Figure 3C:
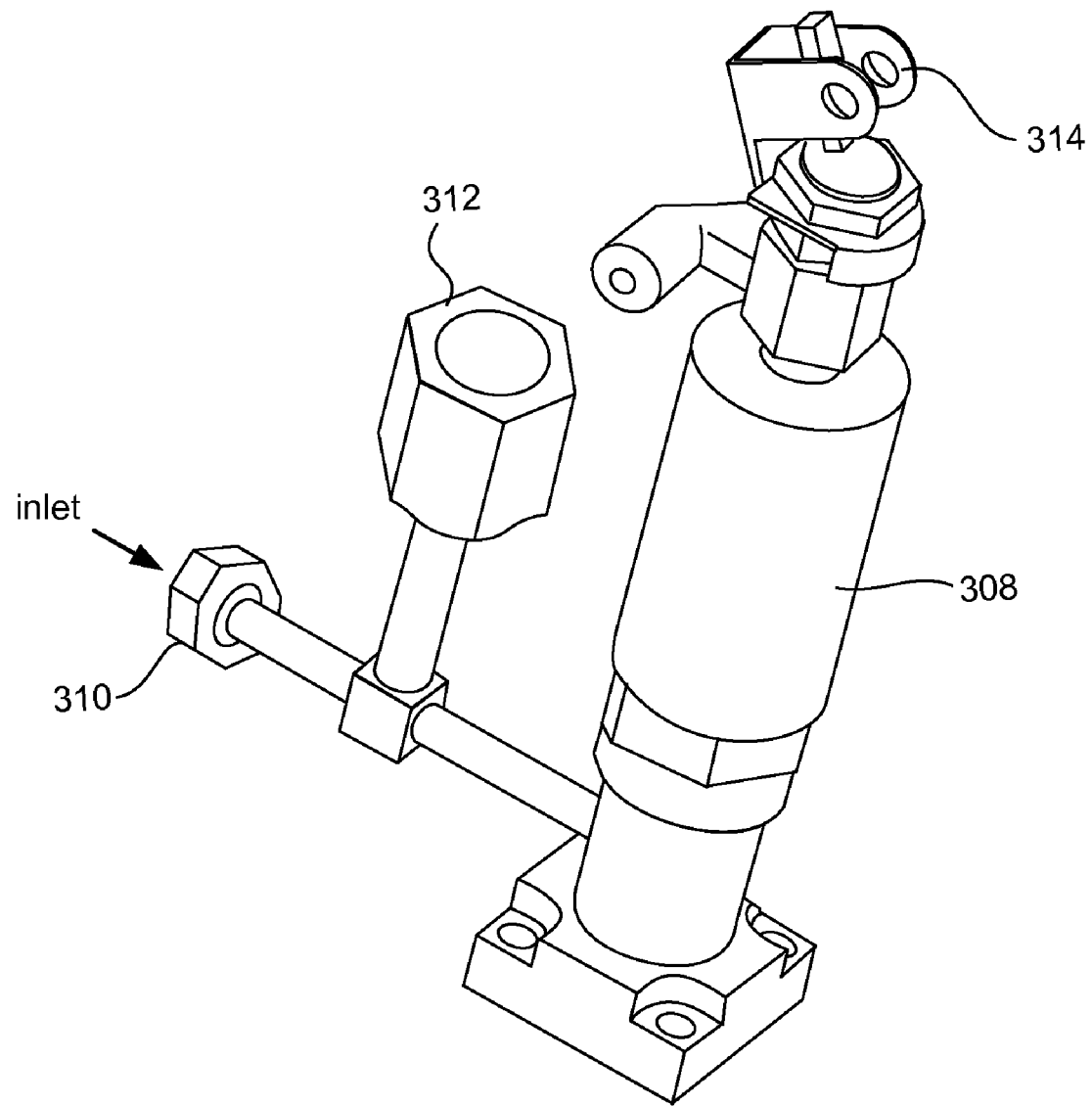

FIGS. 3A-3C illustrate example embodiments of a test port. A test port may be coupled to the pneumatic valve to ensure proper gases are flowing through the gas delivery system. Alternatively, the test port may be used as an additional gas delivery component. For example, the test port may be used to check moisture levels, conduct leak tests of the facility lines, be used as an additional purge valve, and the like. As illustrated in the FIG. 3A, the test port 302 may be coupled to the pneumatic valve 304 near a first end 306. The test port may be any known valve, such as a VCR valve.

FIGS. 3B and 3C illustrate the test port and horizontal inlet port coupled to the pneumatic valve. FIG. 3B illustrates the horizontal inlet port 310 and test port 312 coupled to the IGS pneumatic valve 308. FIG. 3C illustrates the horizontal inlet port 310 and test port 312 coupled to the IGS pneumatic valve 308 having a lockout/tagout mechanism 314. The example embodiments illustrated in FIGS. 3B and 3C eliminate the need to couple the horizontal inlet port to the manifold.

Figure 4:
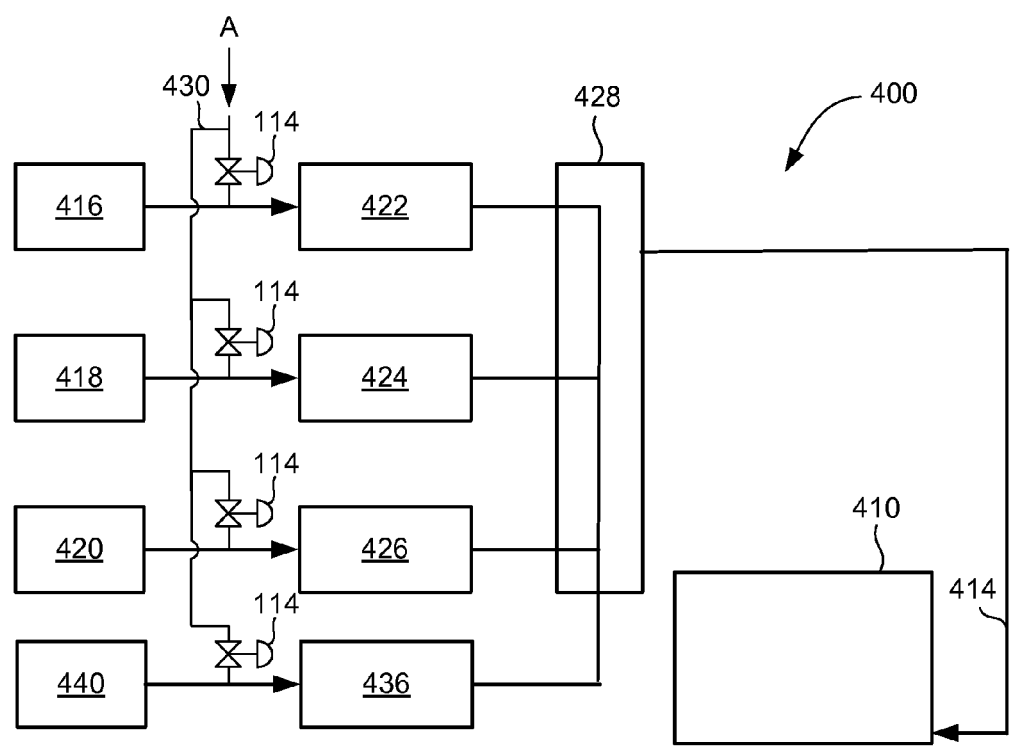
FIG. 4 is a schematic view of an exemplary gas feed device for semiconductor processing.

FIG. 4 is a schematic view of an exemplary gas feed device for semiconductor processing. A plasma etch processing chamber 410 is supplied processing gas through gas supply line 414. The gas supply line 414 may provide process gas to a showerhead or other gas supply arrangement arranged in the upper portion of the chamber. Additionally, gas supply line 414 may supply processing gas to a lower portion of the chamber such as, for example, to a gas distribution ring surrounding the manifold holder or through gas outlets arranged in the manifold support. However, an alternative dual gas feed arrangement can supply gas to the top center and top perimeter of the chamber. Processing gas may be supplied to gas line 414 from gas supplies 416, 418, 420, 430 the process gasses from supplies 416, 418, 420, 430 being supplied to MFC 422, 424, 426, 432 respectively. The MFC 422, 424, 426, 432 supply the process gasses to a mixing manifold 428 after which the mixed gas is directed to gas flow line 414. A pump/purge manifold 430 may connect each individual purge valve 112 (FIGS. 1A and 1B of each gas supply 416, 418, 420, 440. A purge gas, such as nitrogen, may be used to purge the gas feed device 400 at arrow A. The gases may be increased or decreased using the vertical purge port 114 with minimal dead legs and without removal of any of the gas components.

In operation, the user may select the fraction of mixed flow to be delivered to the plasma processing chamber. For example, the user might select a flow of 250 sccm Ar/30 sccm $C_4F_8$/15 sccm $C_4F_6$/22 sccm $O_2$ delivered through line 414. By comparing the total flow, which in this case could be measured by summing all of the flow readouts of the MFC 422, 424, 426, 432 in the gas box, the controller can adjust the degree of throttling in line 414 to achieve the desired flow distribution. Alternatively, an optional total flow meter could be installed just downstream of the mixing manifold 428 to measure the total flow of mixed gas, rather than determining the total flow by summing the readouts of the MFCs 422, 424, 426, 432 in the gas box.

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A gas delivery apparatus, comprising:
a manifold block configured to create a fluid flow path in the gas delivery apparatus;
a horizontal inlet port coupled to the manifold block at a first side in fluid communication with the fluid flow path and configured to receive a supply gas;
a pneumatic valve coupled to the manifold block at a first end configured to prevent unauthorized action of fluid flow, the pneumatic valve in fluid communication with the fluid flow path and horizontal inlet port, wherein the pneumatic valve further comprises a toggle switch coupled to a second end of the pneumatic valve, said toggle switch including a toggle arm, said toggle arm being positioned in one of an activation zone and a deactivation zone, wherein when said toggle arm is positioned in said activation zone, said pneumatic valve is activated, and wherein when said toggle arm is positioned in said deactivation zone, said pneumatic valve is deactivated;
a purge valve coupled to the manifold block in fluid communication with the fluid flow path positioned adjacent the pneumatic valve; and
a vertical purge port coupled to the manifold block at a first end, the vertical purge port positioned between the purge valve and the pneumatic valve and having a purge gas input/output connection at a second end,
wherein the horizontal inlet port is positioned perpendicular to the vertical purge port.

2. The apparatus of claim 1, further comprising a mass flow controller coupled to the manifold block at a second side.

3. The apparatus of claim 1, wherein the toggle switch further comprises an activation prevention mechanism, wherein said activation prevention mechanism is configured to prevent said toggle arm from being repositioned from said deactivation zone to said activation zone without at least bypassing a lockout function of said activation prevention mechanism.

4. The apparatus of claim 1, further comprising a test port coupled to the pneumatic valve near the first end.

5. The apparatus of claim 4, wherein the test port is a VCR valve.

6. A gas delivery apparatus, comprising:
a manifold block configured to create a fluid flow path in the gas delivery apparatus;
a pneumatic valve coupled to the manifold block at a first end configured to prevent unauthorized action of fluid flow, the pneumatic valve in fluid communication with the fluid flow path, wherein the pneumatic valve further comprises a toggle switch coupled to a second end of the pneumatic valve, said toggle switch including a toggle arm, said toggle arm being positioned in one of an activation zone and a deactivation zone, wherein when said toggle arm is positioned in said activation zone, said pneumatic valve is activated, and wherein when said toggle arm is positioned in said deactivation zone, said pneumatic valve is deactivated;
a horizontal inlet port coupled to the pneumatic valve near the first end configured to receive a supply gas;
a purge valve coupled to the manifold block in fluid communication with the fluid flow path positioned adjacent the pneumatic valve; and
a vertical purge port coupled to the manifold block at a first end, the vertical purge port positioned between the purge valve and the pneumatic valve and having a purge gas input/output connection at a second end.

7. The apparatus of claim 6, further comprising a mass flow controller coupled to the manifold block at a second side.

8. The apparatus of claim 6, wherein the toggle switch further comprises an activation prevention mechanism, wherein said activation prevention mechanism is configured to prevent said toggle arm from being repositioned from said deactivation zone to said activation zone without at least bypassing a lockout function of said activation prevention mechanism.

9. The apparatus of claim 6, further comprising a test port positioned between the pneumatic valve and the horizontal inlet port.

10. The apparatus of claim 9, wherein the test port is a VCR valve.

11. The apparatus of claim 6, further comprising a test port positioned on the pneumatic valve.

12. A gas delivery apparatus, comprising:
a manifold block configured to create a fluid flow path in the gas delivery apparatus;
a horizontal inlet port coupled to the manifold block at a first side in fluid communication with the fluid flow path and configured to receive a supply gas;
a first connector configured to receive a first gas component at a first side, the first connector in fluid communication with the fluid flow path and horizontal inlet port, wherein the first connector is a pneumatic valve, wherein the pneumatic valve further comprises a toggle switch coupled to a second end of the pneumatic valve, said toggle switch including a toggle arm, said toggle arm being positioned in one of an activation zone and a deactivation zone, wherein when said toggle arm is positioned in said activation zone, said pneumatic valve is activated, and wherein when said toggle arm is positioned in said deactivation zone, said pneumatic valve is deactivated;

a second connector configured to receive a second gas component, the second connector positioned adjacent the first connector;

a vertical purge port coupled to the manifold block at a first end, the vertical purge port positioned between the first connector and the second connector, and having a purge gas input/output connection at a second end, wherein the horizontal inlet port is positioned perpendicular to the vertical purge port.

13. The apparatus of claim 12, further comprising a mass flow controller coupled to the manifold block at second side.

14. The apparatus of claim 12, wherein the toggle switch further comprises an activation prevention mechanism, wherein said activation prevention mechanism is configured to prevent said toggle arm from being repositioned from said deactivation zone to said activation zone without at least bypassing a lockout function of said activation prevention mechanism.

15. The apparatus of claim 12, wherein the second gas component is a purge valve.

16. The apparatus of claim 12, further comprising a test port positioned on the first gas component.

* * * * *